US012571962B2

(12) United States Patent
Zhang

(10) Patent No.: US 12,571,962 B2
(45) Date of Patent: Mar. 10, 2026

(54) OPTICAL PHASED ARRAY CHIP, CONTROL METHOD, AND WAVEGUIDE OPTICAL PHASED ARRAY SYSTEM

(71) Applicant: SILITH TECHNOLOGY (SUZHOU) CO., LTD., Shanghai (CN)

(72) Inventor: Xingyu Zhang, Shanghai (CN)

(73) Assignee: SILITH TECHNOLOGY (SUZHOU) CO., LTD., Shanghai (CN)

( * ) Notice: Subject to any disclaimer, the term of this patent is extended or adjusted under 35 U.S.C. 154(b) by 0 days.

(21) Appl. No.: 19/216,748

(22) Filed: May 23, 2025

(65) Prior Publication Data

US 2025/0284052 A1      Sep. 11, 2025

Related U.S. Application Data

(63) Continuation of application No. PCT/CN2022/144398, filed on Dec. 31, 2022.

(30) Foreign Application Priority Data

Nov. 23, 2022    (CN) .......................... 202211475209.4

(51) Int. Cl.
*G02B 6/12* (2006.01)
*G02F 1/01* (2006.01)

(52) U.S. Cl.
CPC ..... *G02B 6/12033* (2013.01); *G02B 6/12014* (2013.01); *G02B 6/12019* (2013.01); *G02F 1/0121* (2013.01); *G02F 1/0147* (2013.01)

(58) Field of Classification Search
CPC ............ G02B 6/12033; G02B 6/12014; G02B 6/12019; G02F 1/0121; G02F 1/0147
See application file for complete search history.

(56) References Cited

U.S. PATENT DOCUMENTS

2022/0252914 A1*    8/2022    Lee ......................... G02F 1/011

* cited by examiner

*Primary Examiner* — John Bedtelyon
(74) *Attorney, Agent, or Firm* — JCIPRNET

(57) ABSTRACT

An optical phased array chip, including optical splitting stages with the number being N. Each of the optical splitting stages includes optical waveguide branches; a first end of a first thermal-optic phase shifter is connected to a preset voltage, a first end of a second thermal-optic phase shifter is grounded, and in a common optical waveguide branch, a second end of the first thermal-optic phase shifter and a second end of the second thermal-optic phase shifter are connected to a common voltage, and the first thermal-optic phase shifter and the second thermal-optic phase shifter have the same resistance. When N is greater than 1, the number of optical waveguide branches in a next optical splitting stage is twice the number of optical waveguide branches in a previous optical splitting stage. A method for controlling an optical phased array chip and a waveguide optical phased array system are also provided.

10 Claims, 6 Drawing Sheets

OPTICAL PHASED ARRAY CHIP, CONTROL METHOD, AND WAVEGUIDE OPTICAL PHASED ARRAY SYSTEM

CROSS-REFERENCE TO RELATED APPLICATION

This application is a continuation of international application of PCT application serial no. PCT/CN2022/144398, filed on Dec. 31, 2022, which claims the priority benefit of China application no. 202211475209.4, filed on Nov. 23, 2022. The entirety of each of the above-mentioned patent applications is hereby incorporated by reference herein and made a part of this specification.

BACKGROUND

Technical Field

The present invention relates to the technical field of optical phased arrays, in particular to an optical phased array chip, a control method, and a waveguide optical phased array system.

Description of Related Art

Optical phased arrays (OPAs) have been widely used in various fields, including Lidar, imaging, free-space optical communication, laser ranging, etc. Optical phased arrays can be implemented using liquid crystals, micro-electro-mechanical systems (MEMS), optical waveguides, etc. In recent years, waveguide optical phased arrays have attracted a lot of attentions and been widely used in various applications due to their advantages of fast response, low control voltage, large scanning angle, ease of large-scale integration, and so on.

An optical phase shifter is a core component in an optical phased array, which is used to change the phase of light through an electro-optic or a thermo-optic effect of a material. An electro-optic phase shifter is used to change the phase of light, and but the intensity of light is simultaneously changed due to light absorption, which is not desirable in optical phased array applications. In contrast, a thermal-optic phase shifter, a heater (i.e. a resistor) around a waveguide, changes the refractive index of the waveguide and thus the phase of light through heating, without affecting the light intensity, thereby making it better preferred.

FIG. 1 is a schematic diagram of a waveguide optical phased array chip in the prior art. Referring to FIG. 1, a waveguide optical phased array includes an optical splitter 11, an optical waveguide 12 and a thermal-optic phase shifter 13 for simplicity, with other components such as a light source and emitters are not shown in the figure, wherein as shown in FIG. 1 the cascaded optical splitting sections and phase shifters are two independent parts. In a waveguide optical phased array chip, light emitted by a light source is finally divided into eight paths by three stages of 1×2 optical splitters cascaded. A thermal-optic phase shifter 13 is integrated on each of the eight paths of optical waveguides 12 in a final stage. By applying corresponding voltages or currents (depending on whether a control is voltage-driven or current-driven) to eight thermal-optic phase shifters 13 in the final stage respectively, light output by eight optical waveguides 12 may have a fixed phase difference do relative to each other, such that eight wave sources at different positions cause an interference, eventually directing output beams to a specific direction. The optical beam scanning can be achieved by controlling this phase difference.

Referring to the waveguide optical phased array chip in FIG. 1, different voltages or currents need to be applied to resistors of eight thermal-optic phase shifters 13 to generate a fixed phase difference do. With reference to voltages V1-V8 shown in FIG. 1, phases of light output by the eight optical waveguides 12 are 0, $d\varphi$, $2d\varphi$, $3d\varphi$, $4d\varphi$, $5d\varphi$, $6d\varphi$, and $7d\varphi$ in sequence. A phase change of optical waveguides is directly proportional to thermal power P, that is, directly proportional to the square of a voltage V or a current I, because $P=V2/R$, and $P=I2\times R$. Thus, the phase is non-linearly related to the applied voltage or current, which makes the control of the waveguide optical phased array complex. Furthermore, the phase to be generated by each optical waveguide is different, such that voltages or currents to be applied to optical waveguides are different, making the control more complex. In addition, the above waveguide optical phased array chip with eight paths of output optical channels requires the number of electrical pins being nine, that is to say, N paths of channels require the number of electrical pins being N+1. Such a great number of electrical pins makes the control on the waveguide optical phased array very complex.

Therefore, it is necessary to provide a novel optical phased array chip, a control method and a waveguide optical phased array system to solve the above problems in the prior art.

SUMMARY

An objective of the present invention is to provide an optical phased array chip, a control method and a waveguide optical phased array system, such that a change of a phase difference between optical waves at output ends of optical waveguides in an optical phased array is linearly proportional to the change of a voltage, which can simplify the method for controlling the optical phased array.

To achieve the above objective, the optical phased array chip according to the present invention includes optical splitting stages with the number being N, wherein N is a positive integer; each of the optical splitting stages includes one or more optical waveguide branches; each of the optical waveguide branches in each optical splitting stage includes an optical splitter, a first optical waveguide, a second optical waveguide, a first thermal-optic phase shifter, and a second thermal-optic phase shifter, the first thermal-optic phase shifter being integrated on the first optical waveguide, the second thermal-optic phase shifter being integrated on the second optical waveguide, the optical splitter having a first output port connected to a first end of the first optical waveguide and a second output port connected to a first end of the second optical waveguide; and when N is greater than 1, a second end of a first thermal phase shifter and a second end of a second thermal phase shifter in each of the optical waveguide branches in a previous optical splitting stage are respectively connected to input ports of the two optical splitters in a next optical splitting stage, a first end of the first thermal-optic phase shifter in each of the optical waveguide branches is connected to a preset voltage, a first end of the second thermal-optic phase shifter is grounded, a second end of the first thermal-optic phase shifter and a second end of the second thermal-optic phase shifter in one of the optical waveguide branches are connected to a common voltage pin, and a resistance of the first thermal-optic phase shifter and a resistance of the second thermal-optic phase shifter in one of the optical waveguide branches are the same.

The waveguide optical phased array chip according to the present invention has the following beneficial effects: a change of a phase difference between optical waves at the output ends of optical waveguides in an optical phased array is linearly related to a change of a voltage that needs to be provided, thereby facilitating the control on the waveguide optical phased array chip; and the number of pins required is reduced, which simplifies the control on the phased array.

Optionally, voltage applied to the second end of the first thermal-optic phase shifter and the second end of the second thermal-optic phase shifter in each of the optical waveguide branches are different.

Optionally, in any one of the optical splitting portions, a second end of the first thermal-optic phase shifter and a second end of the second thermal-optic phase shifter are connected to a common voltage.

Optionally, the second ends of all the first thermal-optic phase shifters and the second ends of all the second thermal-optic phase shifters are connected to a common voltage.

Optionally, resistances of all the first thermal-optic phase shifters and all the second thermal-optic phase shifters are the same.

Optionally, resistance of the first thermal-optic phase shifter and resistance of the second thermal-optic phase shifter in the common optical splitting stage are the same, and when N is greater than 1, the resistance of the first thermal-optic phase shifter and the resistance of the second thermal-optic phase shifter in the next optical splitting stage are twice the resistance of the first thermal-optic phase shifter in the previous optical splitting stage.

Optionally, the voltage applied to the second end of the first thermal-optic phase shifter and the second end of the second thermal-optic phase shifter in the common optical waveguide branch is a sum of a direct current (DC) voltage and an adjustable voltage, wherein the DC voltage being used to set an initial phase, and the adjustable voltage being used to generate a phase change so as to control optical beam scanning of a phased array.

The present invention further provides a method for controlling the optical phased array chip, wherein a phase difference between optical waves at output ends of the first waveguide and the second waveguide adjacent to each other in a common optical splitting stage is controlled to be the same, and when N is greater than 1, a phase difference between optical waves at the output ends of the first waveguide and the second waveguide adjacent to each other in a previous optical splitting stage is twice a phase difference between optical waves at the output ends of the first waveguide and the second waveguide adjacent to each other in a next optical splitting stage.

The method for controlling the waveguide optical phased array chip according to the present invention has the following beneficial effects: a change of a phase difference between optical waves at the output ends of optical waveguides in an optical phased array is linearly proportional to a change of a control voltage, thereby easing the control on the waveguide optical phased array chip; and the number of pins required is reduced, which simplifies the control on the phased array.

Optionally, the phase difference between optical waves at the output ends of the first waveguide and the second waveguide adjacent to each other in the common optical splitting stage is controlled by adjusting a voltage applied to a second end of the first thermal-optic phase shifter and a second end of the second thermal-optic phase shifter in the common optical splitting stage, wherein adjusting a voltage applied to a second end of the first thermal-optic phase shifter and a second end of the second thermal-optic phase shifter in the common optical splitting stage includes the following steps:

Get the first data by dividing the square of the preset voltage by the resistance of the first thermal-optic phase shifter in the common optical splitting stage;

Get the second data by dividing the phase difference between optical waves at the output ends of the first waveguide and the second waveguide adjacent to each other in the common optical splitting stage by a first coefficient;

Get the third data by subtracting the second data from the first data; and

Get the fourth data by dividing the resistance of the first thermal-optic phase shifter in the common optical splitting stage by two times of the preset voltage, wherein the voltage applied to the second end of the first thermal-optic phase shifter and the second end of the second thermal-optic phase shifter in the common optical splitting stage is a product of the fourth data and the third data.

The present invention further provides a waveguide optical phased array system, including a light source, the optical phased array chip above, an emitter, and an optical sub-assembly and system connected in sequence, and a control circuit, where the control circuit is connected to the light source and the optical phased array chip and configured to control the light source and the optical phased array chip.

The waveguide optical phased array system according to the present invention has the following beneficial effects: the change of the phase difference between optical waves at the output ends of adjacent waveguides of the optical phased array chip in the optical phased array system is linearly proportional to a change of a control voltage, which can simplify the method for controlling a phased array and reduce the number of electrical pins required.

DESCRIPTION OF THE EMBODIMENTS

Figure 1:
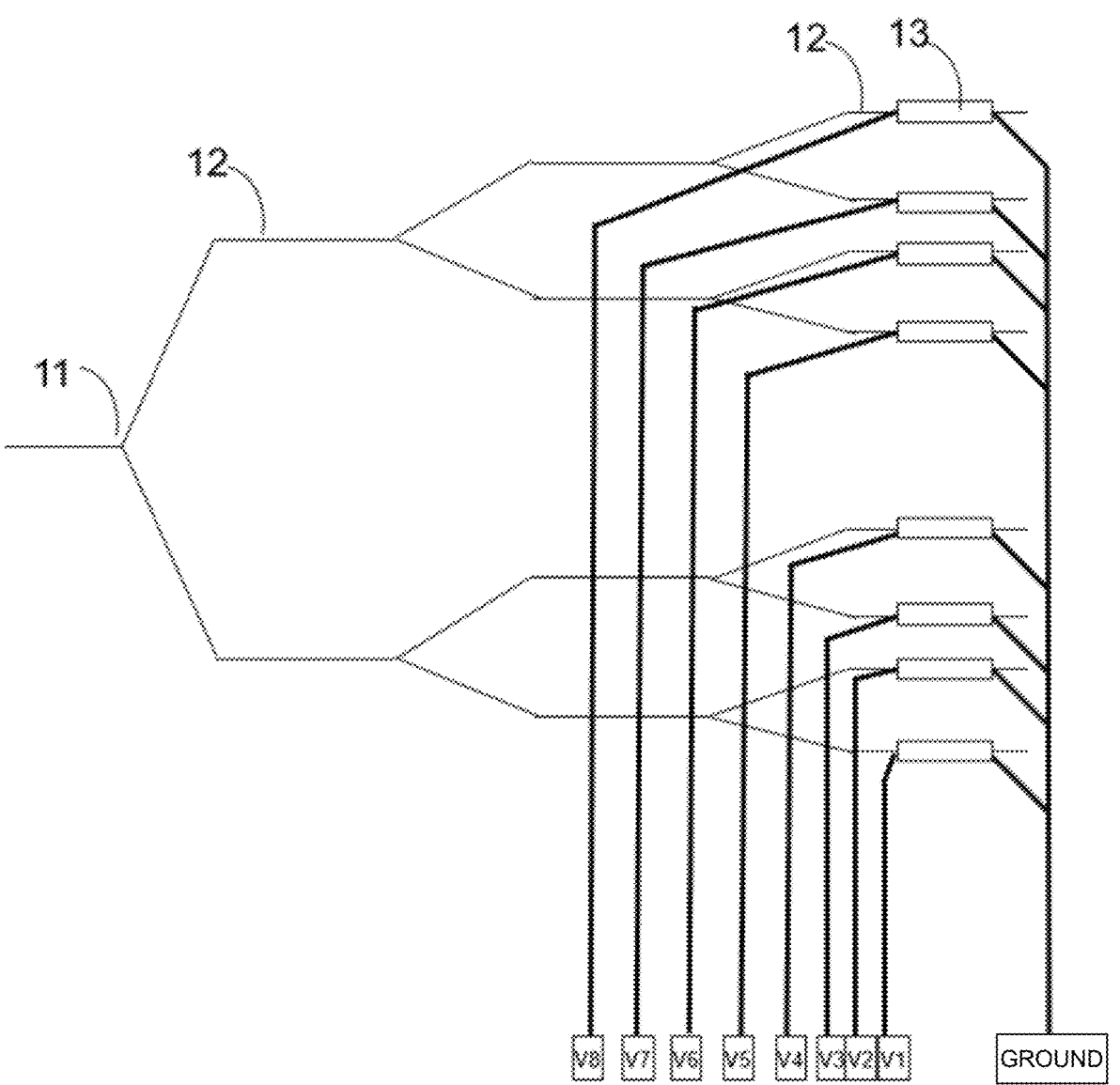
FIG. 1 is a schematic diagram of a waveguide optical phased array chip in the prior art.

To make the objective, technical solutions and advantages of the present invention clearer, the technical solutions in the embodiments of the present invention will be clearly and completely described below with reference to the accompanying drawings of the present invention. Apparently, the embodiments described are some rather than all of the embodiments of the present invention. All other embodiments obtained by those of ordinary skill in the art based on the embodiments of the present invention without creative efforts shall fall within the scope of protection of the present invention. The technical or scientific terms used herein shall have the usual meanings understood by those of ordinary skill in the art to which the present invention belongs, unless otherwise defined. The similar term such as "include or comprise" refers to that an element or item that appears before the term covers elements or items listed after the term and their equivalents, without excluding other elements or items.

In view of the problems existing in the prior art, an embodiment of the present invention provides an optical phased array chip including optical splitting stages with the number being N, wherein N is a positive integer. Each of the optical splitting stages includes one or more optical waveguide branches. Each of the optical waveguide branches in each of the optical splitting stages includes an optical splitter, a first optical waveguide, a second optical waveguide, a first thermal-optic phase shifter, and a second thermal-optic phase shifter, wherein the first thermal-optic phase shifter is integrated on the first optical waveguide, the second thermal-optic phase shifter is integrated on the second optical waveguide, the optical splitter having a first output port connected to a first end or an electrical end of the first optical waveguide and a second output port connected to a first end or an electrical end of the second optical waveguide. And when N is greater than 1, a second end or an optical end of a first thermal phase shifter and a second end or an optical end of a second thermal phase shifter in each of the optical waveguide branches within a previous optical splitting stage are connected to input ports of the two optical splitters within a next optical splitting portion stage respectively, a first end or an electrical end of the first thermal-optic phase shifter in each of the optical waveguide branches is connected to a preset voltage, a first end or an electrical end of the second thermal-optic phase shifter is grounded, a second end or an optical end of the first thermal-optic phase shifter and a second end or an optical end of the second thermal-optic phase shifter in one of optical waveguide branches are connected to a common voltage, and a resistance of the first thermal-optic phase shifter and a resistance of the second thermal-optic phase shifter in one of the optical waveguide branches are the same.

In some embodiments, voltages applied to the second end of the first thermal-optic phase shifter and the second end of the second thermal-optic phase shifter in each of the optical waveguide branches are different.

In some embodiments, in any one of the optical splitting stages, a second end of the first thermal-optic phase shifter and a second end of the second thermal-optic phase shifter are connected to a common voltage.

In some embodiments, the second ends of all the first thermal-optic phase shifters and the second ends of all the second thermal-optic phase shifters are connected to a common voltage.

In some embodiments, resistances of all the first thermal-optic phase shifters and the second thermal-optic phase shifters are the same.

In some embodiments, a resistance of the first thermal-optic phase shifter and a resistance of the second thermal-optic phase shifter in the common optical splitting stage are the same, and when N is greater than 1, the resistance of the first thermal-optic phase shifter and the resistance of the second thermal-optic phase shifter in the next optical splitting stage are twice the resistance of the first thermal-optic phase shifter in the previous optical splitting stage.

Figure 2:
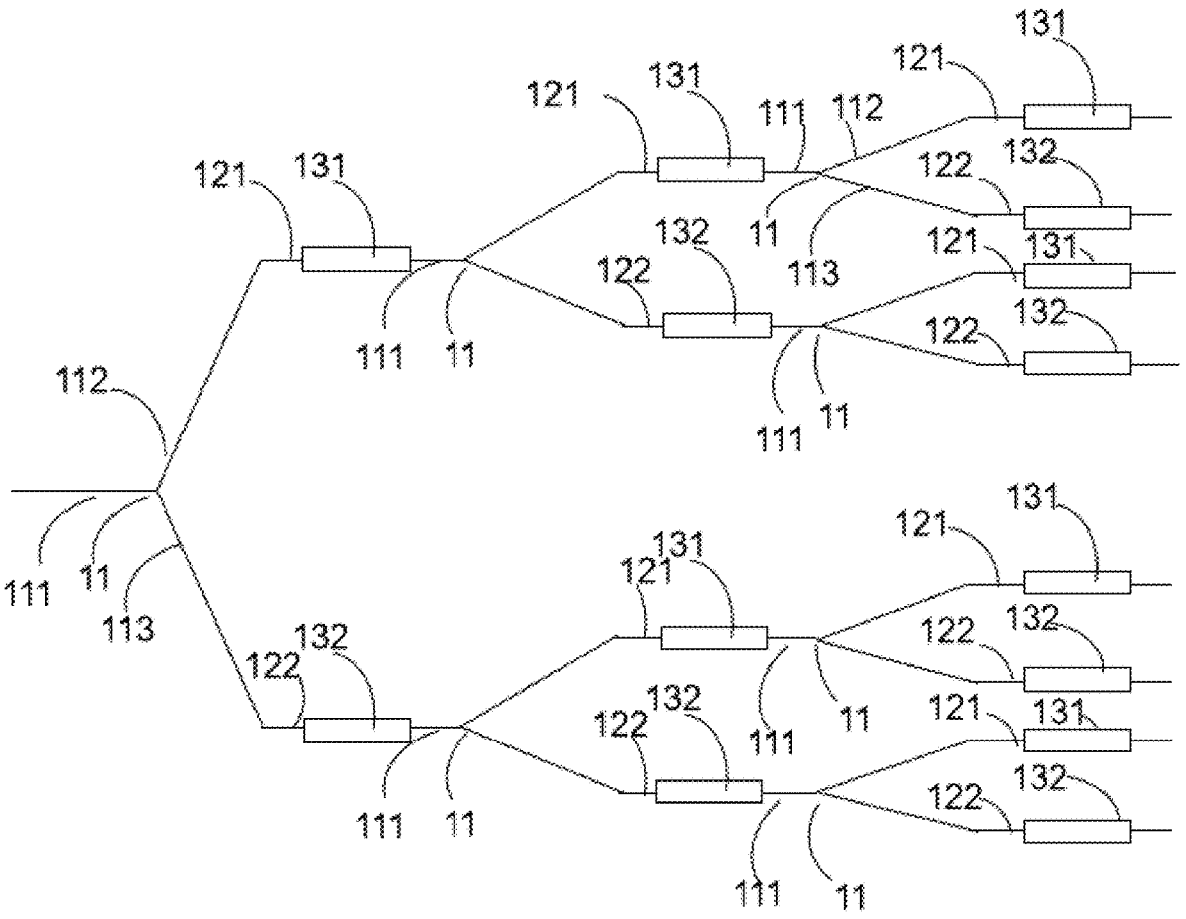
FIG. 2 is a schematic diagram of a waveguide optical phased array chip in some embodiments of the present invention.

FIG. 2 is a schematic diagram of a waveguide optical phased array chip in some embodiments of the present invention. Referring to FIG. 2, the waveguide optical phased array includes three optical splitting stages cascaded in sequence from left to right, where a first optical splitting stage includes an optical waveguide branch, a second optical splitting stage includes two optical waveguide branches, and a third optical splitting stage includes four optical waveguide branches; each of the optical waveguide branches includes an optical splitter 11, a first optical waveguide 121, a second optical waveguide 122, a first thermal-optic phase shifter 131, and a second thermal-optic phase shifter 132, wherein the first thermal-optic phase shifter 131 is integrated on the first optical waveguide 121, the second thermal-optic phase shifter 132 is integrated on the second optical waveguide 122. The optical splitter 11 has a first output port 112 connected to an input end of the first optical waveguide 121 and a second output port 113 connected to an input end of the second optical waveguide 122. An output end of the first optical waveguide 121 and an output end of the second optical waveguide 122 within the first optical splitting stage are respectively connected to input ports 111 of the two optical splitters 11 within the second optical splitting stage, and an output end of the first optical waveguide 121 and an output end of the second optical waveguide 122 within the second optical splitting stage are respectively connected to input ports 111 of the two optical splitters 11 within the third optical splitting stage and a resistance of the first thermal-optic phase shifter 131 and a resistance of the second thermal-optic phase shifter 132 in a common one of the optical waveguide branches are the same. According to the waveguide optical phased array chip in the embodiment of the present invention, output ends of eight optical waveguides are thus formed by three cascaded 1×2 optical splitters, a thermal-optic phase shifter is provided on each of two waveguides after optical splitting in each stage, instead of providing eight phase shifters on eight optical waveguides only in a final stage which are usually done in a structure of a conventional waveguide optical phased array as shown in FIG. 1.

Figure 3:
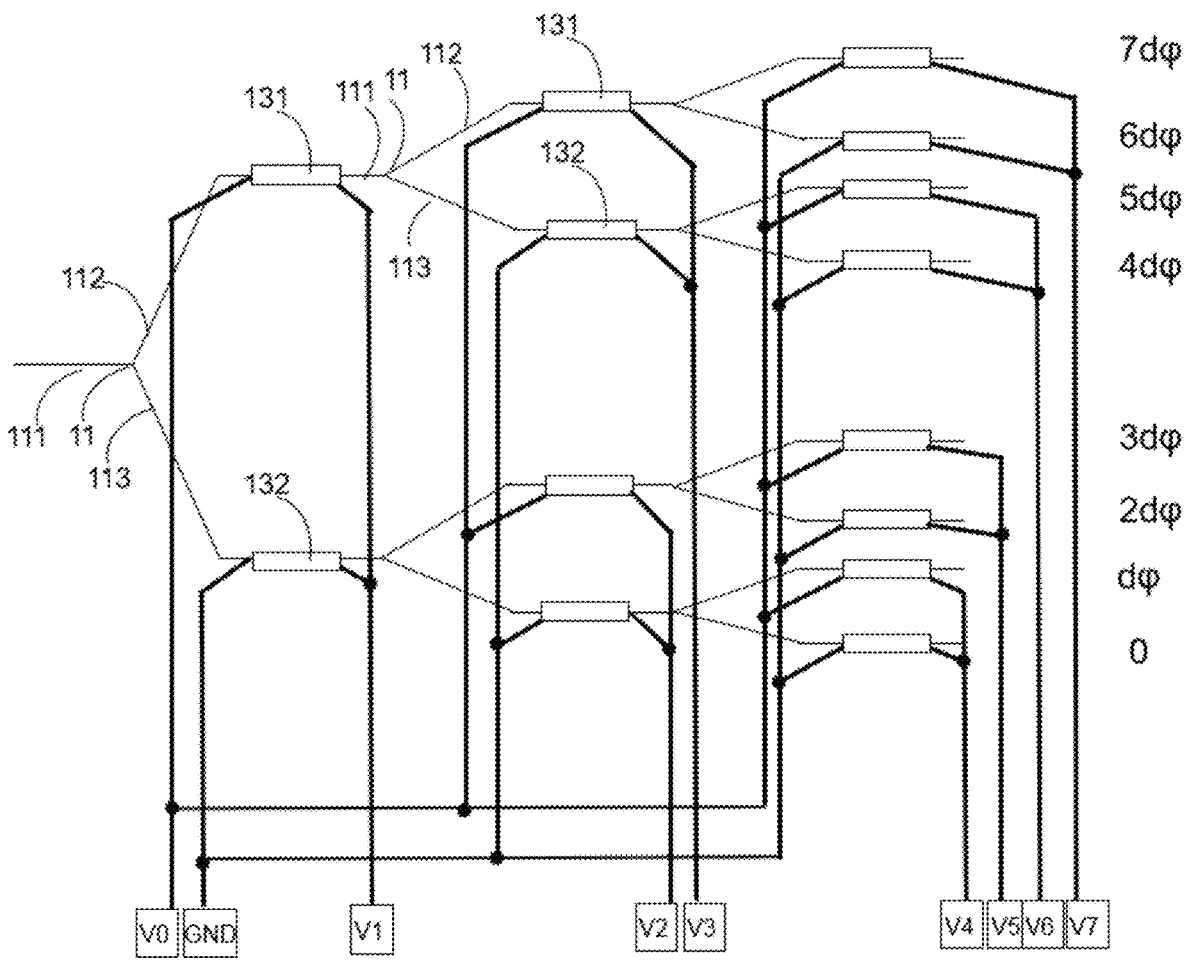
FIG. 3 is a schematic diagram of how the control voltage is applied onto the waveguide optical phased array chip through electrical connection in some embodiments of the present invention.

FIG. 3 is a schematic diagram of how the control voltage is applied onto the waveguide optical phased array chip through electrical connection in some embodiments of the present invention. Referring to FIG. 3, in the waveguide optical phased array chip, input ends of all the first thermal-optic phase shifters 131 are connected to a common preset voltage V0, and input ends of all the second thermal-optic phase shifters 132 are connected to a ground pin GND; and in one of the optical waveguide branches, an output end of the first thermal-optic phase shifter 131 and an output end of the second thermal-optic phase shifter 132 are connected to a common voltage. That is, an output end of the first thermal-optic phase shifter 131 and an output end of the second thermal-optic phase shifter 132 in an optical waveguide branch within a first optical splitting stage are connected to a voltage V1, output ends of the first thermal-optic phase shifters 131 and output ends of the second thermal-optic phase shifters 132 in two optical waveguide branches within a second optical splitting stage are respectively connected to a voltage V2 and a voltage V3, output ends of the first thermal-optic phase shifters 131 and output ends of the second thermal-optic phase shifters 132 in four optical waveguide branches within a third optical splitting stage are respectively connected to a voltage V4, a voltage V5, a voltage V6, and a voltage V7, the resistance of each of the two thermal phase shifters connected to the common voltage V1 is R1, the resistance of each of the two thermal phase shifters connected to the common voltage V2 is R2, the resistance of each of the two thermal phase shifters connected to the common voltage V3 is R3, the resistance of each of the two thermal phase shifters connected to the common voltage V4 is R4, the resistance of each of the two thermal phase shifters connected to the common voltage V5 is R5, the resistance of each of the two thermal phase shifters connected to the common voltage V6 is R6, the resistance of each of the two thermal phase shifters connected to the common voltage V7 is R7, and resistances of R1 to R7 are all equal to R.

An operating principle of the waveguide optical phased array chip according to the present invention is illustrated using the waveguide optical phased array chip in the embodiment of FIG. 3 of the present invention as an example below.

A relationship between the phase difference $\Delta\varphi k$ between optical waves at the output ends of the first optical waveguide and the second optical waveguide in each optical waveguide branch and an applied voltage Vk is as follows:

$$\Delta\varphi k = A\left(\frac{(V0-Vk)^2}{Rk} - \frac{(Vk-0)^2}{Rk}\right) = A\left(\frac{V0^2}{Rk} - \frac{2V0}{Rk}Vk\right) \qquad \text{Formula 1}$$

wherein A is a first coefficient, the first coefficient A is determined by the properties of waveguide material and structure and can be measured. A Formula 2 can be derived from the Formula 1.

$$\Delta\varphi k \propto \frac{(V0-Vk)^2}{Rk} - \frac{(Vk-0)^2}{Rk} = \frac{V0^2}{Rk} - \frac{2V0}{Rk}Vk \qquad \text{Formula 2}$$

wherein V0 is a preset voltage, Vk is a voltage applied to the first thermal-optic phase shifter 131 and the second thermal-optic phase shifter 132 in a common optical waveguide branch, Rk is a resistance of the first thermal-optic phase shifter 131 and the second thermal-optic phase shifter 132 connected to the common control voltage Vk, k being 1~7, and $\Delta\varphi1$~$\Delta\varphi7$ refer to phase differences between phase shifters connected to V1~V7 respectively, that is, $\Delta\varphi1$ refers to the phase difference between two phase shifters connected to a voltage V1, $\Delta\varphi2$ refers to the phase difference between two phase shifters connected to a voltage V2, $\Delta\varphi3$ refers to the phase difference between two phase shifters connected to a voltage V3, $\Delta\varphi4$ refers to the phase difference between two phase shifters connected to a voltage V4, $\Delta\varphi5$ refers to the phase difference between two phase shifters connected to a voltage V5, $\Delta\varphi6$ refers to the phase difference between two phase shifters connected to a voltage V6, and $\Delta\varphi7$ refers to the phase difference between two phase shifters connected to a voltage V7.

It can be seen from the Formula 1 that the final phase difference $\Delta\varphi k$ is linearly proportional to the applied voltage Vk, because terms Vk2 of phases of upper and lower arms are subtracted to be canceled. The voltages V1~V7 are adjusted so that the phase difference between two arms after each optical splitter meets the requirements that $\Delta\varphi1$ is directly proportional to 4d$\varphi$, $\Delta\varphi2$ and $\Delta\varphi3$ are directly proportional to 2d$\varphi$ respectively, and $\Delta\varphi4$, $\Delta\varphi5$, $\Delta\varphi6$, and $\Delta\varphi7$ are directly proportional to do respectively, and eventually phase changes of light output by eight optical waveguides within the third optical splitting stage after three stages stacked are 0, d$\varphi$, 2d$\varphi$, 3d$\varphi$, 4d$\varphi$, 5d$\varphi$, 6d$\varphi$, and 7d$\varphi$ in sequence from bottom to top, that is, a fixed phase difference d$\varphi$ exists between the waveguides. In the waveguide optical phased array chip of the present invention, a phase change of optical waveguides is linearly proportional to a change of a control voltage that needs to be provided, thereby easing the control on the waveguide optical phased array chip. Moreover, when the cascaded number of optical splitters is increased to 4 or above, the number of pins required is less than that of an optical phased array chip in the prior art, thereby simplifying the control on the phased array. Although the eight-paths phased array is used as an example in this embodiment, the present invention is not limited thereto, and the number of paths may also be extended to M, where M is an even number. When the number of optical paths in the phased array increases, such as the number being 64, 128, or above, a conventional phased array and its control will become more complex, and the beneficial effects of the waveguide optical phased array chip according to the present invention will be more prominent.

Figure 4:
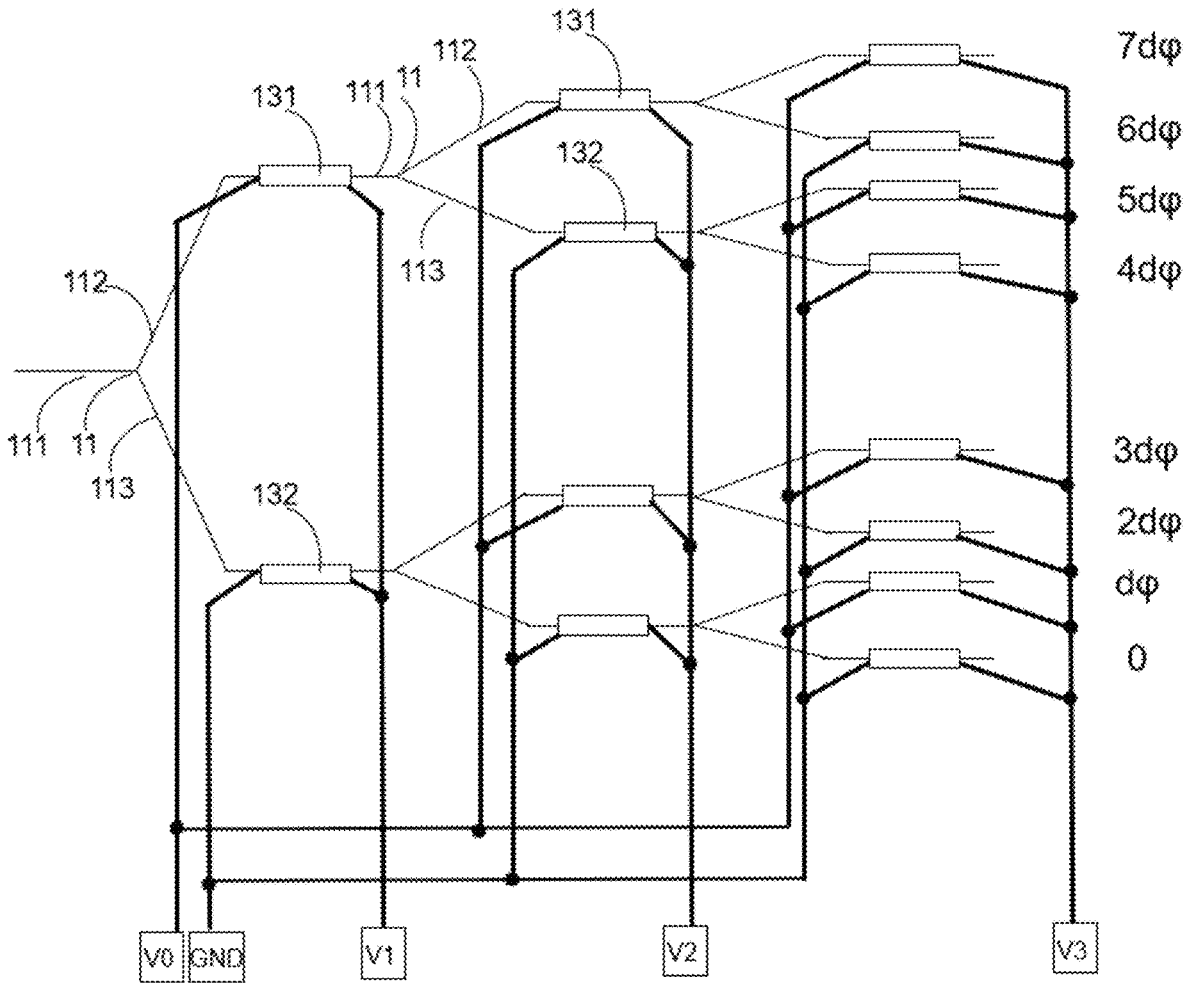
FIG. 4 is a schematic diagram of how the control voltage is applied onto the waveguide optical phased array chip through electrical connection in some other embodiments of the present invention.

FIG. 4 is a schematic diagram of how the control voltage is applied onto the waveguide optical phased array chip through electrical connection in some other embodiments of the present invention. Referring to FIG. 4, in the waveguide optical phased array chip, an output end of the first thermal-optic phase shifter 131 and an output end of the second thermal-optic phase shifter 132 in an optical waveguide branch within a first optical splitting stage are connected to a voltage V1, output ends of the first thermal-optic phase shifters 131 and output ends of the second thermal-optic phase shifters 132 in two optical waveguide branches within a second optical splitting stage are all connected to a voltage V2, and output ends of the first thermal-optic phase shifters 131 and output ends of the second thermal-optic phase shifters 132 in four optical waveguide branches within a third optical splitting stage are all connected to a voltage V3. The resistance of each of the two thermal phase shifters connected to the voltage V1 is R1, the resistance of the two thermal phase shifters connected to the voltage V2 is R2, the resistance of the two thermal phase shifters connected to the voltage V3 is R3, and resistances of R1, R2, and R3 are all equal to R.

An operating principle of the waveguide optical phased array chip in the embodiment of FIG. 4 of the present invention is as follows:

Vk in the formula 1 is V1~V3, a phase difference between upper and lower arms after optical splitting in each stage is directly proportional to a voltage applied to the stage, and $\Delta\varphi1$~$\Delta\varphi3$ refer to phase differences between the optical waves at output ends of the two phase shifters within the optical splitting stage connected to V1~V3 respectively, that is, $\Delta\varphi1$ refers to a phase difference between the optical waves at output ends of the two phase shifters within a first optical splitting stage, $\Delta\varphi2$ refers to a phase difference between the optical waves at output ends of the two phase shifters under a common optical splitting waveguide branch within a second optical splitting stage, and $\Delta\varphi3$ refers to a phase difference between the optical waves at output ends of the two phase shifters under a common optical waveguide branch within a third optical splitting stage. The voltages V1, V2, and V3 are adjusted so that a phase difference between two arms after three stages of optical splitting meets the requirements that $\Delta\varphi1 \propto 4d\varphi$, $\Delta\varphi2 \propto 2d\varphi$, and $\Delta\varphi3 \propto d\varphi$, and eventually phase changes of light output by eight optical waveguides within a third optical splitting stage after three stages stacked are 0, $d\varphi$, $2d\varphi$, $3d\varphi$, $4d\varphi$, $5d\varphi$, $6d\varphi$, and $7d\varphi$ in sequence from bottom to top, that is, a fixed phase difference $d\varphi$ exists between the waveguides. In the waveguide optical phased array chip according to the present invention, a phase change of optical waveguides is linearly proportional to a change of a control voltage that needs to be provided, thereby facilitating the control on the waveguide optical phased array chip, and the number of pins required is reduced, which simplifies the control on the phased array.

Figure 5:
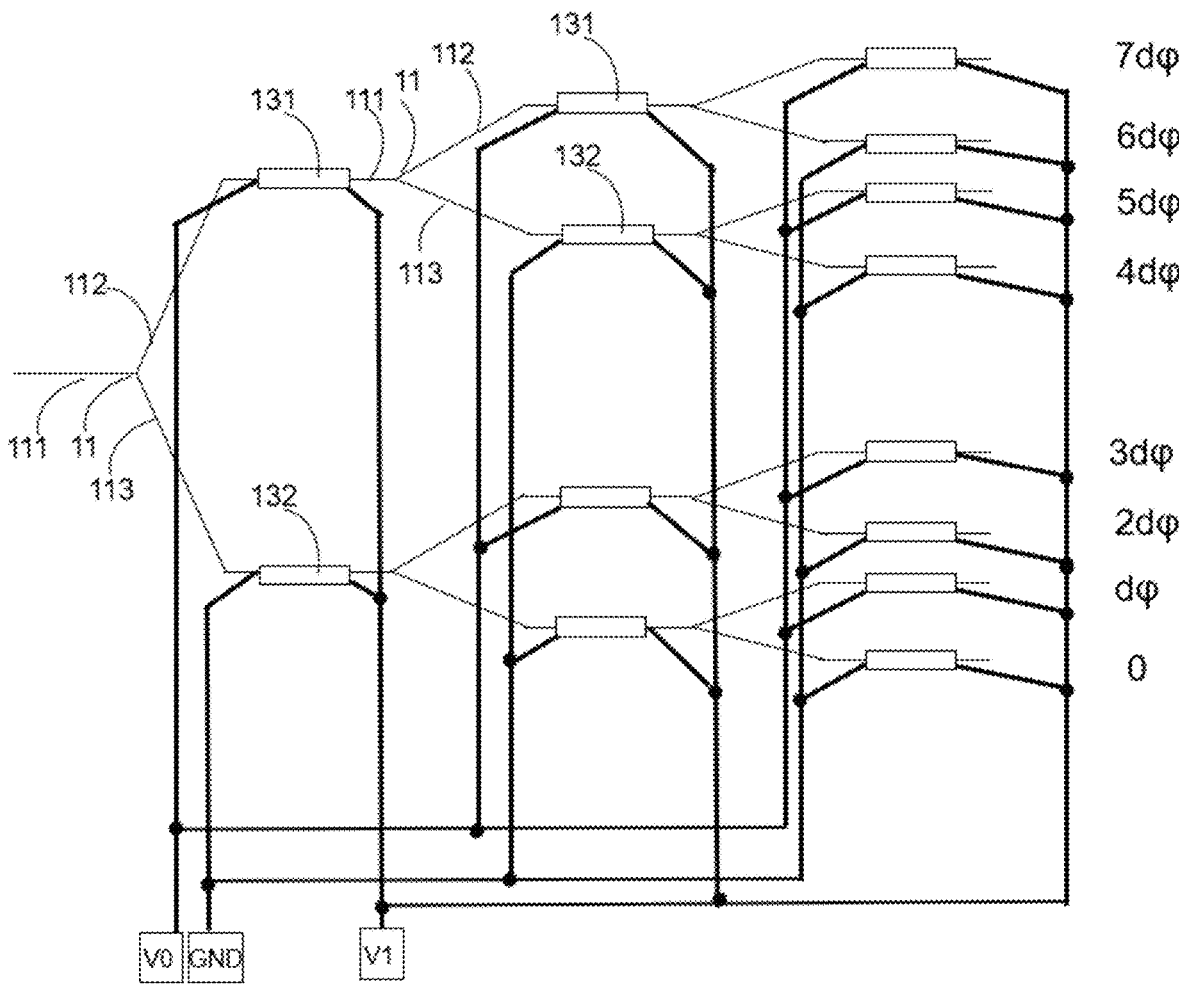
FIG. 5 is a schematic diagram of how the control voltage is applied a connection relationship between onto the waveguide optical phased array chip through electrical connection and a control voltage in yet some embodiments of the present invention.

FIG. 5 is a schematic diagram of how the control voltage is applied onto the waveguide optical phased array chip through electrical connection in yet some embodiments of the present invention. Referring to FIG. 5, in the waveguide optical phased array chip, output ends of the first thermal-optic phase shifters 131 and output ends of the second thermal-optic phase shifters 132 in the optical waveguide branches within three optical splitting stages are all connected to a voltage V1, resistances of the first thermal-optic phase shifter 131 and the second thermal-optic phase shifter 132 in a first optical splitting stage are each R, resistances of the first thermal-optic phase shifter 131 and the second thermal-optic phase shifter 132 in a second optical splitting stage are each 2R, and resistances of the first thermal-optic phase shifter 131 and the second thermal-optic phase shifter 132 in a third optical splitting stage are both twice the resistances of the first thermal-optic phase shifters 131 in the second optical splitting stage, that is, the resistances of the first thermal-optic phase shifter 131 and the second thermal-optic phase shifter 132 in the third optical splitting stage are each 4R.

An operating principle of the waveguide optical phased array chip in the embodiment of FIG. 5 of the present invention is as follows:

Vk in the formula 1 is V1, resistances of thermal-optic phase shifters in a first optical splitting stage, a second optical splitting stage and a third optical splitting stage are R, 2R, and 4R, respectively, and $\Delta\varphi1 \sim \Delta\varphi3$ refer to phase differences between phase shifters connected to V1-V3 respectively, that is, $\Delta\varphi1$ refers to a phase difference between two phase shifters in the first optical splitting stage, $\Delta\varphi2$ refers to a phase difference between two phase shifters under a common optical splitting waveguide branch in the second optical splitting stage, and $\Delta\varphi3$ refers to a phase difference between two phase shifters under a common optical waveguide branch in the third optical splitting stage, such that it is ensured that only a control voltage is used to make a phase difference between two arms after three stages of optical splitting still meet the requirements that $\Delta\varphi1 \propto 4d\varphi$, $\Delta\varphi2 \propto 2d\varphi$, and $\Delta\varphi3 \propto d\varphi$, and eventually phase changes of light output by eight optical waveguides in the third optical splitting stage after three stages stacked are 0, $d\varphi$, $2d\varphi$, $3d\varphi$, $4d\varphi$, $5d\varphi$, $6d\varphi$, and $7d\varphi$ in sequence from bottom to top, that is, a fixed phase difference $d\varphi$ exists between the waveguides. Control voltages of all thermal-optic phase shifters in each stage can be connected to a common pin, that is, a common voltage V1 is used for control, thereby simplifying the control on the waveguide optical phased array chip and reducing the number of pins.

In some embodiments, the voltage applied to the second end of the first thermal-optic phase shifter and the second end of the second thermal-optic phase shifter in the same optical waveguide branch is a sum of a direct current (DC) voltage and an adjustable voltage, wherein the DC voltage is used to set an initial phase, and the adjustable voltage is used to generate a phase change so as to control optical beam scanning of the phased array.

In some specific embodiments, the voltage Vk connected to the first thermal-optic phase shifter 131 and the second thermal-optic phase shifter 132 in a common optical waveguide branch is a sum of a DC voltage Vk_0 and an adjustable voltage Vk_t, namely, Vk=Vk_0+Vk_t, where k is a positive integer, Vk_0 is a DC voltage and can be used to set an initial phase and calibrate an initial state of the phased array, and Vk_t is an adjustable voltage used to generate a phase change so as to control optical beam scanning of the phased array. The phase difference between the upper and lower arms under a common optical splitting waveguide branch in each optical splitting stage is linearly proportional to Vk_t. Compared with a conventional solution in FIG. 1 of the present application, a method for loading the control voltage is simplified after an initial phase calibration voltage is added. The control voltage in the conventional solution depends on the initial phase, because the phase difference is not linearly proportional to the control voltage. The nonlinear coefficients generated by different initial phases are different, which is more complex.

The present invention further provides a method for controlling the above optical phased array chip. In the control method, a phase difference of output ends of the first waveguide and the second waveguide adjacent to each other in a common optical splitting stage is controlled to be same, and when N is greater than 1, a phase difference of output ends of the first waveguide and the second waveguide adjacent to each other in a previous optical splitting stage is twice a phase difference of output ends of the first waveguide and the second waveguide adjacent to each other in a next optical splitting stage.

In some embodiments, the phase difference of the output ends of the first waveguide and the second waveguide adjacent to each other in a common optical splitting stage is controlled by adjusting a voltage applied to a second end of the first thermal-optic phase shifter and a second end of the second thermal-optic phase shifter in the common optical splitting stage, wherein adjusting a voltage applied to a second end of the first thermal-optic phase shifter and a second end of the second thermal-optic phase shifter in the common optical splitting stage includes the following steps:

Get the first data by dividing a square of the preset voltage by an adjusted resistance of the first thermal-optic phase shifter in a common optical splitting stage;

Get the second data by using a quotient obtained by dividing the phase difference of the output ends of the first waveguide and the second waveguide adjacent to each other in a common optical splitting stage by a first coefficient;

Get the third data by using a difference obtained by subtracting the second data from the first data; and Get the fourth data by dividing the resistance of the first thermal-optic phase shifter in the common optical splitting stage by two times of the preset voltage, wherein the voltage applied to the second end of the first thermal-optic phase shifter and the second end of the second thermal-optic phase shifter in the common optical splitting stage is a product of the fourth data and the third data.

In some embodiments, a relationship between a phase difference $\Delta\varphi k$ between the first optical waveguide and the second optical waveguide in each optical waveguide branch and an applied voltage Vk is as follows:

$$\Delta\varphi k = A\left(\frac{(V0-Vk)^2}{Rk} - \frac{(Vk-0)^2}{Rk}\right) = A\left(\frac{V0^2}{Rk} - \frac{2V0}{Rk}Vk\right) \qquad \text{Formula 1}$$

wherein A is a first coefficient, the first coefficient is determined by the properties of waveguide material and structure. A formula 3 can be derived from the Formula 1.

$$Vk = \frac{Rk}{2V0}\left(\frac{V0^2}{Rk} - \frac{\Delta\varphi k}{A}\right) \qquad \text{Formula 3}$$

wherein V0 is a preset voltage, Vk is a voltage applied to the first thermal-optic phase shifter 131 and the second thermal-optic phase shifter 132 in a common optical splitting waveguide branch within a common optical splitting stage, Rk is a resistance of each of the first thermal-optic phase shifter 131 and the second thermal-optic phase shifter 132 connected to the same control voltage Vk, and k is a positive integer.

It can be seen from the Formula 3 that the phase difference $\Delta\varphi k$ of the output ends of the first waveguide and the second waveguide adjacent to each other in the common optical splitting stage is controlled by adjusting the voltage Vk connected to the second end of first thermal-optic phase shifter and the second end of the second thermal-optic phase shifter in the common optical splitting stage.

In the method for controlling the waveguide optical phased array chip according to the present invention, a phase change of optical waveguides is linearly proportional to a change of a control voltage that needs to be provided, thereby easing the control on the waveguide optical phased array chip; and the number of pins required is reduced, which simplifies the control on a phased array.

Figure 6:
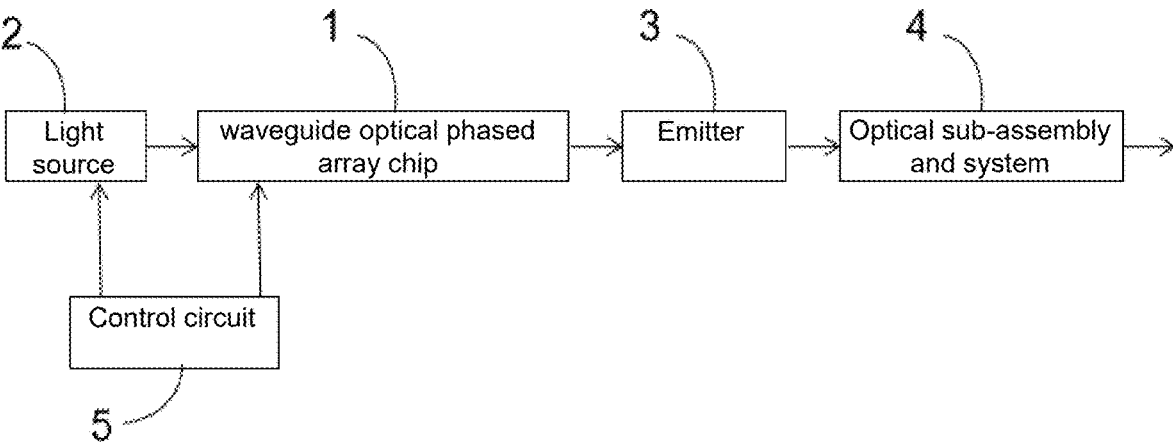
FIG. 6 is a schematic diagram of a waveguide optical phased array system in some embodiments of the present invention.

The present invention further provides an optical phased array chip system. FIG. 6 is a schematic diagram of a waveguide optical phased array system in some embodiments of the present invention. Referring to FIG. 6, the waveguide optical phased array system according to the present invention includes a light source 2, the optical phased array chip 1, an emitter 3 and an optical sub-assembly and system 4 connected in sequence, and a control circuit 5, wherein the control circuit 5 is connected to the light source 2 and the optical phased array chip 1 and configured to control the light source and the optical phased array chip. In the waveguide optical phased array system including the waveguide optical phased array chip, according to the present invention, a phase change of optical waveguides is linearly proportional to a change of a control voltage that needs to be provided, thereby easing the control on the waveguide optical phased array chip, and the number of pins required is reduced, which simplifies the control on a phased array.

In some embodiments, all the parts of the waveguide optical phased array system are fully integrated on a common chip. In some other embodiments, part of the waveguide optical phased array system is integrated on the chip, while the other part is outside the chip.

In some embodiments, the light source is integrated in the waveguide optical phased array chip by heterogeneous integration or hybrid integration. In some other embodiments, the light source is an external light source, and light is launched into the waveguide optical phased array chip by a coupling method.

In some embodiments, the control circuit and a waveguide optical phased array are integrated on a common chip. In some other embodiments, the waveguide optical phased array is connected to an external electronic chip or circuit board.

In some embodiments, the emitter is a one-dimensional array. In some other embodiments, the emitter forms a two-dimensional or three-dimensional array by way of waveguide routing. The emitter includes but is not limited to a waveguide, a waveguide grating, or a Bragg reflector.

In some embodiments, the optical sub-assembly and system includes but is not limited to a lens, a prism, a concave mirror, a resonant cavity, a filter, an amplifier, or an attenuator.

In some embodiments, the waveguide optical phased array system may not include the optical sub-assembly and system.

In some embodiments, the integrated material platform for the waveguide optical phased array includes but is not limited to silicon, silicon on insulator, silicon on sapphire, silicon dioxide, aluminum oxide, indium phosphide, lithium niobate, or a polymer.

In some embodiments, the waveguide of the waveguide optical phased array includes but is not limited to a channel waveguide, a ridge waveguide, a slot waveguide, a diffused waveguide, or a photonic crystal waveguide.

In some embodiments, the waveguide materials are of a same material, while in some other embodiments, different waveguide materials are used in different sections of the chip.

In some embodiments, the operating wavelength range of the phased array includes but is not limited to a visible band, an O band, an E band, an S band, a C band, an L band, a U band, and a mid-infrared band.

In some embodiments, the working wavelength of the phased array may be a same fixed wavelength or a tunable wavelength.

In some embodiments, the heating resistor material of the thermal phase shifter includes but is not limited to titanium nitride, doped silicon, or tungsten.

In some embodiments, the optical splitter of the optical splitting stage includes but is not limited to a multimode interference coupler, a directional coupler, a bent coupler, an adiabatic coupler, a Y-shaped branch, a trident coupler, a photonic crystal coupler, and a metamaterial coupler.

In some embodiments, the resistance R, 2R, or 4R of the thermal phase shifter may have some deviation and may be still acceptable within a certain tolerance range, that is, the optical phased array chip and system can still work effectively even under a small deviation in resistance.

In some embodiments, application fields of the phased array include lidars, beam control, optical sensing, optical interconnection, free-space optical communication, optical storage, or optical computing.

Although the embodiments of the present invention have been described in detail above, it is apparent to those skilled in the art that various modifications and variations can be made to these embodiments. However, it is to be understood that such modifications and variations are within the scope and spirit of the invention as described in the appended claims and embodiments. Furthermore, the present invention described herein may have other embodiments and may be carried out or implemented in various ways.

What is claimed is:

1. An optical phased array chip, comprising at least two optical splitting stages; each of the optical splitting stages comprises optical waveguide branches; each of the optical waveguide branches in each of the optical splitting stages comprises an optical splitter, a first optical waveguide, a second optical waveguide, a first thermal-optic phase shifter and a second thermal-optic phase shifter, the first thermal-optic phase shifter being integrated on the first optical waveguide, the second thermal-optic phase shifter being integrated on the second optical waveguide, the optical splitter having a first output port connected to a first end of the first optical waveguide and a second output port connected to a first end of the second optical waveguide; and a second end of a first thermal phase shifter and a second end of a second thermal phase shifter in each of the optical waveguide branches in a previous optical splitting stage are respectively connected to input ports of the two optical splitters in a next optical splitting stage, the optical waveguide branches in a next optical splitting stage having a number twice that of the optical waveguide branches in a previous optical splitting stage;

wherein first ends of all the first thermal-optic phase shifters in each of the optical waveguide branches are connected to a preset voltage, first ends of all the second thermal-optic phase shifters are grounded, a second end of the first thermal-optic phase shifter and a second end of the second thermal-optic phase shifter in a same one of the optical waveguide branches are connected to a common controlled voltage, and a resistance of the first thermal-optic phase shifter and a resistance of the second thermal-optic phase shifter in one of the optical waveguide branches are the same; and wherein a phase difference between the first thermal-optic phase shifter and the second thermal-optic phase shifter in the same one of the optical waveguide branches, is linearly proportional to the common controlled voltage applied to the first thermal-optic phase shifter and the second thermal-optic phase shifter.

2. The optical phased array chip according to claim 1, wherein voltages applied to the second end of the first thermal-optic phase shifter and the second end of the second thermal-optic phase shifter in each of the optical waveguide branches are different.

3. The optical phased array chip according to claim 2, wherein the second ends of all the first thermal-optic phase shifters and the second ends of all the second thermal-optic phase shifters are connected to a common voltage.

4. The optical phased array chip according to claim 3, wherein a resistance of the first thermal-optic phase shifter and a resistance of the second thermal-optic phase shifter in a common optical splitting stage are the same, and when N is greater than 1, a resistance of the first thermal-optic phase shifter and a resistance of the second thermal-optic phase shifter in the next optical splitting stage are twice a resistance of the first thermal-optic phase shifter in the previous optical splitting stage.

5. The optical phased array chip according to claim 2, wherein resistances of all the first thermal-optic phase shifters and all the second thermal-optic phase shifters are the same.

6. The optical phased array chip according to claim 1, wherein in any one of the optical splitting stages, a second end of the first thermal-optic phase shifter and a second end of the second thermal-optic phase shifter are connected to a common voltage.

7. The optical phased array chip according to claim 1, wherein the voltage applied to the second end of the first thermal-optic phase shifter and the second end of the second thermal-optic phase shifter in a common optical waveguide branch is a sum of a direct current (DC) voltage and an adjustable voltage, the DC voltage being used to set an initial phase, the adjustable voltage being used to generate a phase change so as to control optical beam scanning of a phased array.

8. A method for controlling the optical phased array chip according to claim 1, wherein a phase difference between optical waves at output ends of the first waveguide and the second waveguide adjacent to each other in a common optical splitting stage is controlled to be the same, and when N is greater than 1, a phase difference between optical waves at the output ends of the first waveguide and the second waveguide adjacent to each other in a previous optical splitting stage is twice a phase difference of between optical waves at the output ends of the first waveguide and the second waveguide adjacent to each other in a next optical splitting stage.

9. The method according to claim 8, wherein the phase difference between optical waves at the output ends of the first waveguide and the second waveguide adjacent to each other in the common optical splitting stage is controlled by adjusting a voltage applied to a second end of the first thermal-optic phase shifter and a second end of the second thermal-optic phase shifter in the common optical splitting stage, wherein the adjusting a voltage applied to a second end of the first thermal-optic phase shifter and a second end of the second thermal-optic phase shifter in the common optical splitting stage comprises the following steps of:

getting the first data by dividing a square of the preset voltage by an adjusted resistance of the first thermal-optic phase shifter in the common optical splitting stage;

getting the second data by using a quotient obtained by dividing the phase difference between optical waves at the output ends of the first waveguide and the second waveguide adjacent to each other in the common optical splitting stage by a first coefficient;

getting the third data by using a difference obtained by subtracting the second data from the first data; and getting the fourth data by dividing the adjusted resistance of the first thermal-optic phase shifter in the common optical splitting stage by two times of the preset voltage, wherein the voltage applied to the second end of the first thermal-optic phase shifter and the second end of the second thermal-optic phase shifter in the common optical splitting stage is a product of the fourth data and the third data.

10. A waveguide optical phased array system, comprising a light source, the optical phased array chip according to claim 1, an emitter, and an optical sub-assembly and system connected in sequence, and a control circuit, wherein the control circuit is connected to the light source and the optical phased array chip and configured to control the light source and optical phased array.

* * * * *